United States Patent
Feldner et al.

(10) Patent No.: US 9,168,598 B2
(45) Date of Patent: Oct. 27, 2015

(54) FORWARD EXTENDING WORKPIECE SUPPORT

(75) Inventors: Jason Feldner, Mount Prospect, IL (US); John Ronn, Arlington Heights, IL (US); Gregory Menze, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 13/334,467

(22) Filed: Dec. 22, 2011

(65) Prior Publication Data

US 2013/0160629 A1    Jun. 27, 2013

(51) Int. Cl.
*B23D 47/02*   (2006.01)

(52) U.S. Cl.
CPC ............ *B23D 47/025* (2013.01); *Y10T 83/889* (2015.04)

(58) Field of Classification Search
CPC ........ B23D 47/025; B23D 47/02; B23D 1/14; B23D 7/08; Y10S 269/901; B27C 5/04; B27B 27/02
USPC ......................... 83/648, 490–493, 767, 471.3
See application file for complete search history.

(56) References Cited

U.S. PATENT DOCUMENTS

| | | | | |
|---|---|---|---|---|
| 4,875,399 A | * | 10/1989 | Scott et al. | 83/468.3 |
| 5,146,825 A | * | 9/1992 | Dehari | 83/397 |
| 5,564,323 A | * | 10/1996 | Sasaki et al. | 83/471.3 |
| 5,819,623 A | | 10/1998 | Sasaki et al. | |
| 6,240,822 B1 | * | 6/2001 | Musser | 83/446 |
| 7,228,775 B2 | | 6/2007 | Wang | |
| 8,025,001 B2 | * | 9/2011 | Chen et al. | 83/471.3 |
| 8,166,860 B2 | * | 5/2012 | Gibbons et al. | 83/473 |
| 2004/0154448 A1 | * | 8/2004 | Romo et al. | 83/471.3 |
| 2005/0056345 A1 | * | 3/2005 | Duginske | 144/144.1 |
| 2005/0247177 A1 | | 11/2005 | Hetcher et al. | |
| 2005/0262985 A1 | * | 12/2005 | Talesky | 83/581 |
| 2007/0209493 A1 | * | 9/2007 | Chen | 83/452 |
| 2008/0302224 A1 | | 12/2008 | Chen et al. | |
| 2009/0260495 A1 | * | 10/2009 | Opsitos et al. | 83/98 |
| 2011/0000352 A1 | * | 1/2011 | Shibata et al. | 83/471.2 |

FOREIGN PATENT DOCUMENTS

WO    2005102626 A2    11/2005

OTHER PUBLICATIONS

International Search Report in corresponding PCT application (i.e., PCT/US2012/070752), mailed Apr. 17, 2013 (10 pages).

* cited by examiner

*Primary Examiner* — Ned Landrum
*Assistant Examiner* — Fernando Ayala
(74) *Attorney, Agent, or Firm* — Maginot Moore & Beck LLP

(57) ABSTRACT

A power saw arrangement includes a saw blade, a base, a table and a supplemental support. The base defines a support surface and includes first and second stops. The table is movably coupled to the base and rotates about a table axis. The handle extends from the table and is movable relative to the base between first and second positions. In the first and second positions, the handle engages the first and second stops, respectively. A handle space is defined by movement of the handle between the first and second stops. The supplemental support does not provide the first or second stop. The supplemental support is movably coupled to the base and is moveable between extended and retracted positions. In the extended and retracted positions, the supplemental support is positioned within and without the handle space, respectively.

11 Claims, 22 Drawing Sheets

FORWARD EXTENDING WORKPIECE SUPPORT

FIELD

This application relates to the field of workpiece supports and particularly to supplemental workpiece supports which extend forwardly.

BACKGROUND

FIG. 1a depicts a conventional power saw arrangement 100 including a base 102, a fence 120, a motor 122, a saw blade 124, a table 140 and a handle 160. In this example, the power saw arrangement 100 is that of a miter saw. A support surface 104 of the base 102 is used to support a workpiece thereon during a cutting operation. The fence 120 is coupled to the base 102 perpendicular to the support surface 104, and the workpiece abuts the fence 120 during the cutting operation. The table 140 is movably coupled to the base 102 such that it rotates about a table axis 142. The saw blade 124 is coupled to the table 140 and is configured to rotate with the table 140 as is well known in the art. The table 140 also includes a table surface 144 perpendicular to the table axis 142 and substantially coplanar with the support surface 104. The table 140 includes a saw blade opening 146 defined in the table surface 144. The saw blade opening 146 is configured to receive the saw blade 124, operated by the motor 122, during the cutting operation. The saw blade opening 146 is fixed with respect to the table 140 such that it rotates with the table 140. The saw blade opening 146 is aligned with the handle 160. The handle 160 is fixed to the table 140 and extends outwardly therefrom. Movement of the handle 160 about the table axis 142 results in rotation of the table 140 about the table axis 142.

FIG. 1b illustrates a top view of the base of the basic power saw arrangement shown in FIG. 1a. FIGS. 1c and 1d illustrate top views of the basic power saw arrangement 100 shown in FIG. 1a including the table and the handle. For simplicity, the illustrations of the basic power saw arrangement in FIGS. 1b-1d do not include the motor or the saw blade. As shown in FIG. 1b, the base 102 includes the support surface 104, as well as a first wall 106 and a second wall 108 which are perpendicular to the support surface 104. Referring to FIGS. 1c and 1d, the first wall 106 and second wall 108 are also provided in planes that are parallel to the table axis 142. The first wall 106 includes at least one point that acts as a first stop 107 which contacts the handle 160 as the handle 160 rotates with the table 140 in the direction of the first wall 106. As shown in FIG. 1c, upon contact with the first wall 106, the first stop 107 prevents the handle 160 from rotating any farther in the direction of the first wall 106. The second wall 108 includes at least one point that acts as a second stop 109 which contacts the handle 160 as the handle 160 rotates with the table 140 in the direction of the second wall 108. As shown in FIG. 1d, upon contact with the second wall 108, the second stop 109 prevents the handle 160 from rotating any farther in the direction of the second wall 108. It will be recognized that the first stop 107 and the second stop 109 may be provided in the form of planar surfaces or single points. The first stop 107 and the second stop 109 may be provided in the same or in different forms. In the exemplary embodiment shown in FIGS. 1b-1d, the first stop 107 and the second stop 109 are both provided in the form of planar surfaces.

As used herein, the term "handle space" refers to the space occupied by the handle 160, and the space directly above or below the handle (i.e., in the direction defined by axis 142) when the handle moves between the first stop 107 and the second stop 109. Thus, the "handle space" includes the space extending across the full range of motion of the handle 160. An illustration of the handle space 110 for the saw of FIGS. 1c and 1d is provided by the diagonal lines in FIG. 1b. As shown in FIGS. 1c and 1d, the handle 160 includes a handle edge 162 positioned opposite the table 140. When the handle 160 contacts the first stop 107, a point on the handle edge 162 and the first stop 107 define a first plane 106a that is parallel to the table axis 142. When the handle 160 contacts the second stop 109, a point on the handle edge 162 and the second stop 109 define a second plane 108a that is parallel to the table axis 142. Thus, the "handle space" 110 for the exemplary saw of FIGS. 1c-1d is provided within the space between the first plane 106a and the second plane 108a, along an arc 143 defined by the outermost edge of the handle when the handle moves between the first stop 107 and the second stop 109. In various power saws, corresponding structures create corresponding "handle spaces" as defined above.

FIG. 2 illustrates the base of a basic power saw arrangement 100 like that shown in FIGS. 1b-1d. The power saw arrangement 100 includes the table 140 and the handle 160 which projects from the table 140 into the handle space 110. When the table 140 rotates about the table axis 142, the handle 160 moves within the handle space 110. The movement of the handle 160 within the handle space 110 is limited by contact with the first stop 107 and the second stop 109. Consequently, the rotation of the table 140 is limited by the movement of the handle 160 within the handle space 110.

When performing a cutting operation, a user places the workpiece 10 (illustrated by dotted lines in FIG. 2) on the support surface 104 and the table surface 144 as shown. The workpiece 10 rests against the fence 120 to control the position and prevent movement of the workpiece 10 during the cutting operation. The workpiece 10 has a length 12 and a width 14. The angle of the handle 160, and thus the angle of the table 140, with respect to the base 102, determines the angle of the saw blade opening 146 which is configured to receive the saw blade. Therefore, when the saw blade opening 146 is aligned with the centerline 103 of the base 102, the saw blade will cut the workpiece at an angle of approximately 90 degrees.

As shown in FIG. 3, the table 140 can be rotated by rotating the handle 160 relative to the base 102 such that the saw blade opening 146 is no longer aligned with the centerline 103 of the base 102. When the handle 160 is rotated relative to the base 102, the table 140 is also rotated relative to the base 102 such that the saw blade and the saw blade opening 146 are rotated relative to the base 102. Because this arrangement causes the saw blade opening 146 to be out of alignment with the centerline 103 of the base 102, the workpiece 10 is cut at an angle other than 90 degrees.

As illustrated by FIGS. 2 and 3, the size of the workpiece 10 that can be accommodated by the power saw arrangement 100 is somewhat limited by the size of the base 102 and the position of the fence 120. In particular, if the width 14 of the workpiece 10 is too great, the workpiece 10 will not be stably supported by the support surface 104 and the table surface 144 which may result in inconsistent cuts. Therefore, supplemental supports which extend into the handle space 110 accommodate workpieces 10 having greater widths 14. However, supplemental supports which extend into the handle space 110 limit the range of movement of the handle 160 within the handle space 110 and thus limit the angles at which workpieces 10 can be cut. In view of the foregoing, it would be advantageous to provide an improved power saw arrangement including supplemental supports accommodating workpieces having greater widths. It would be further advantageous if the supplemental supports did not extend into the handle space unless necessary for wider workpieces so that the range of angles for rotation of the table would not be unnecessarily reduced.

SUMMARY

In accordance with one embodiment of the disclosure, there is provided a power saw arrangement including a saw blade. The power saw arrangement also includes a base, a table, a handle and a supplemental support. The base defines a support surface. The base also includes a first stop and a second stop. The table is moveably coupled to the base and is configured to rotate about a table axis. The handle extends from the table. The table and the handle are moveable relative to the base between a first position, wherein the handle engages the first stop, and a second position, wherein the handle engages the second stop. A handle space is defined by movement of the handle between the first stop and the second stop. The supplemental support is movably coupled to the base and moveable between an extended position and a retracted position. The supplemental support is not positioned within said handle space in the retracted position and is positioned within said handle space in the extended position. The supplemental support does not provide the first stop or the second stop.

In accordance with another embodiment of the disclosure, there is provided a power saw including a base, a table, a handle, a saw and a supplemental support surface. The table includes a support surface. The base further includes a first wall and a second wall. The table is configured to rotate relative to the base about a table axis. The table includes a table surface that is perpendicular to the table axis and substantially coplanar with the support surface. The handle projects from the table. The handle is moveable within a handle space between the first wall and the second wall. The saw is coupled to the table and configured to rotate with the table. The supplemental support is coupled to the base and rotatable with respect to the base. The supplemental support is movable between an extended position, wherein the supplemental support extends into the handle space, and a retracted position, wherein the supplemental support does not extend into the handle space.

In accordance with yet another embodiment of the disclosure, there is provided a power saw including a base, a table, a handle, a saw and a supplemental support. The base includes a support surface and at least one of a mount member or a slot. The base further includes a first wall providing a first stop and a second wall providing a second stop. The table is configured to rotate relative to the base about a table axis. The table includes a table surface that is perpendicular to the table axis. The handle projects from the table is and moveable with the table. The handle is limited in movement between the first stop and the second stop defining a handle space. The saw is coupled to the table and is configured to rotate with the table. The supplemental support is coupled to the base and moveable with respect to the base between an extended position, wherein the supplemental support extends into the handle space, and a retracted position, wherein the supplemental support does not extend into the handle space. The supplemental support includes a supplemental support surface that is coplanar with the support surface of the base when the supplemental support is in the extended position.

The above described features and advantages, as well as others, will become more readily apparent to those of ordinary skill in the art by reference to the following detailed description and accompanying drawings. While it would be desirable to provide a power saw arrangement that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 1b depicts a top view of the base of the basic power saw arrangement shown in FIG. 1a;

FIGS. 1c and 1d depict top views of the basic power saw arrangement shown in FIG. 1a;

DESCRIPTION

FIGS. 4-18 depict alternative embodiments of power saw arrangements. The power saw arrangements shown in FIGS.

Figure 1A:
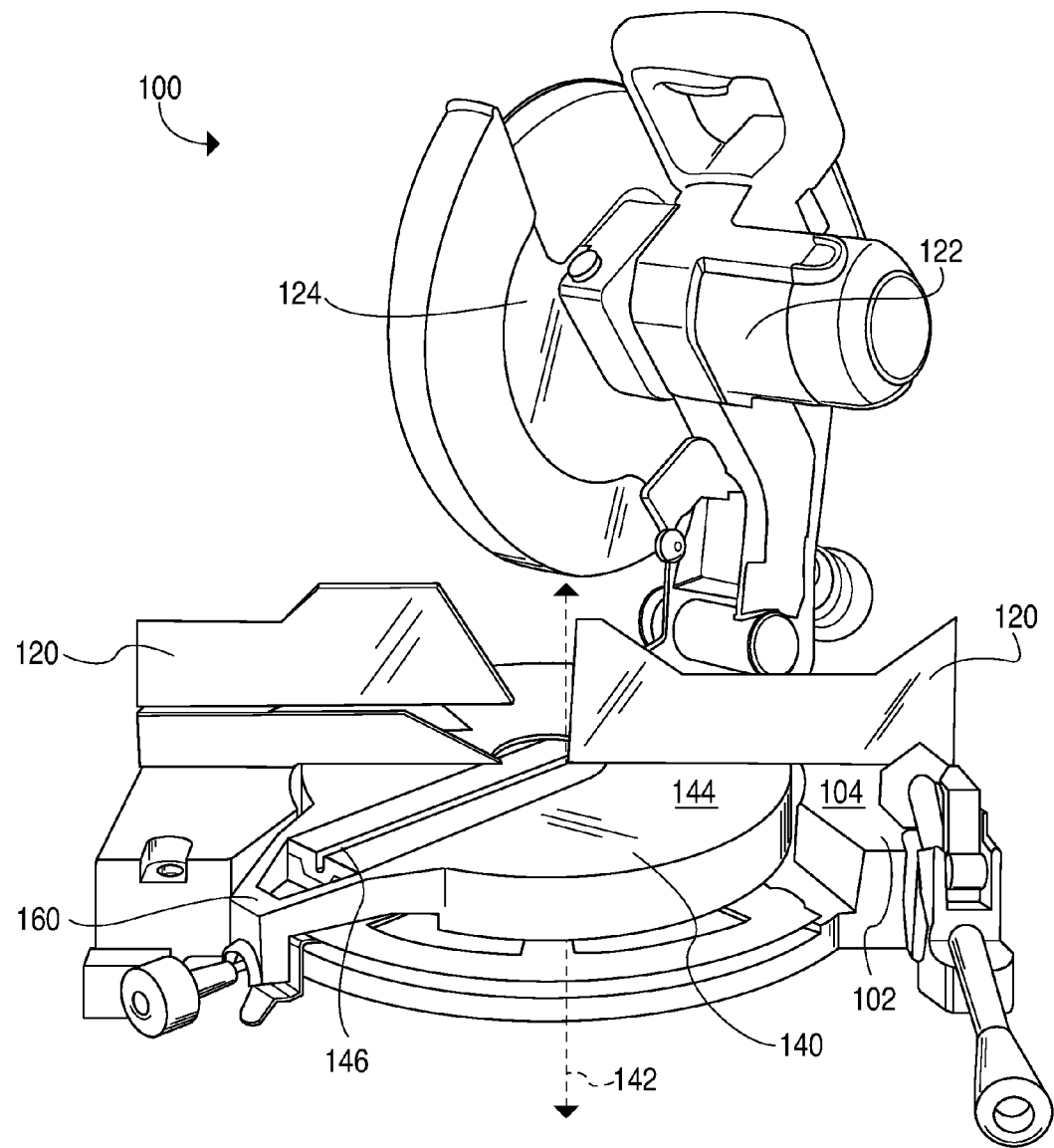
FIG. 1a depicts a basic power saw arrangement.
Figure 1B:
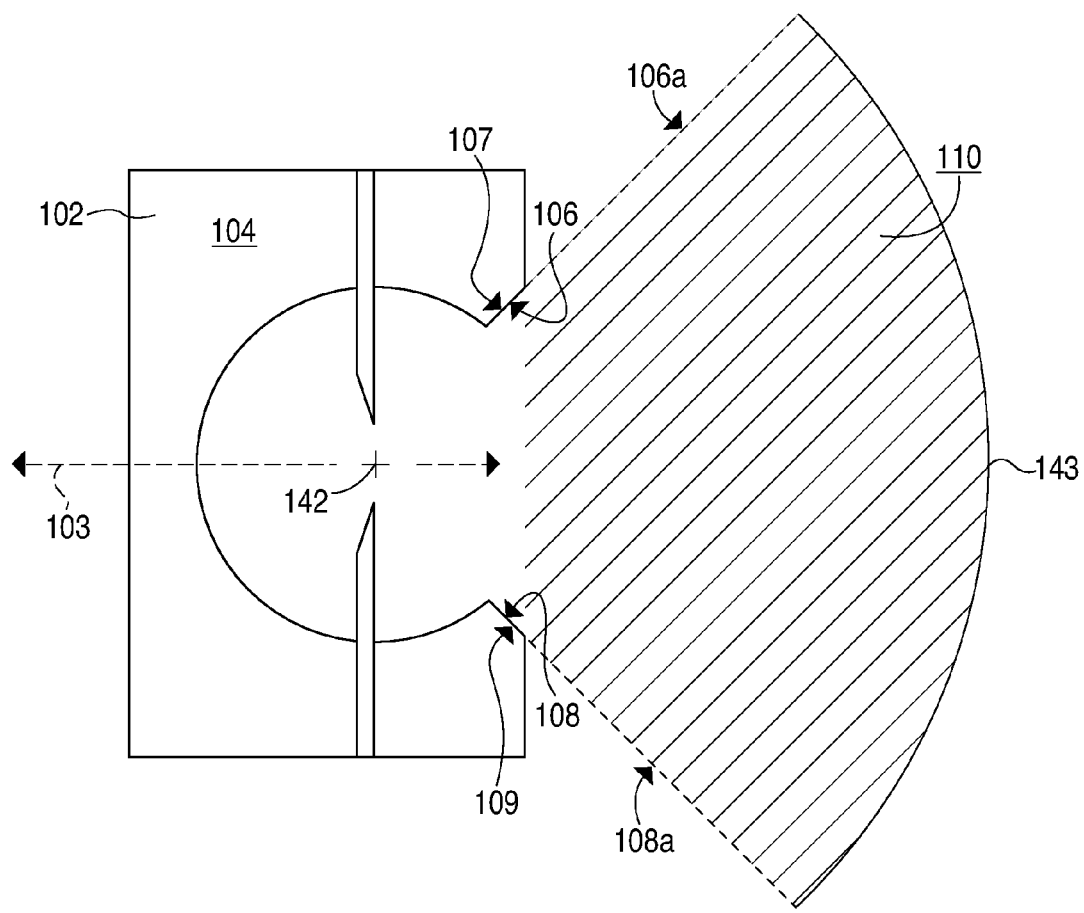
Figure 1C:
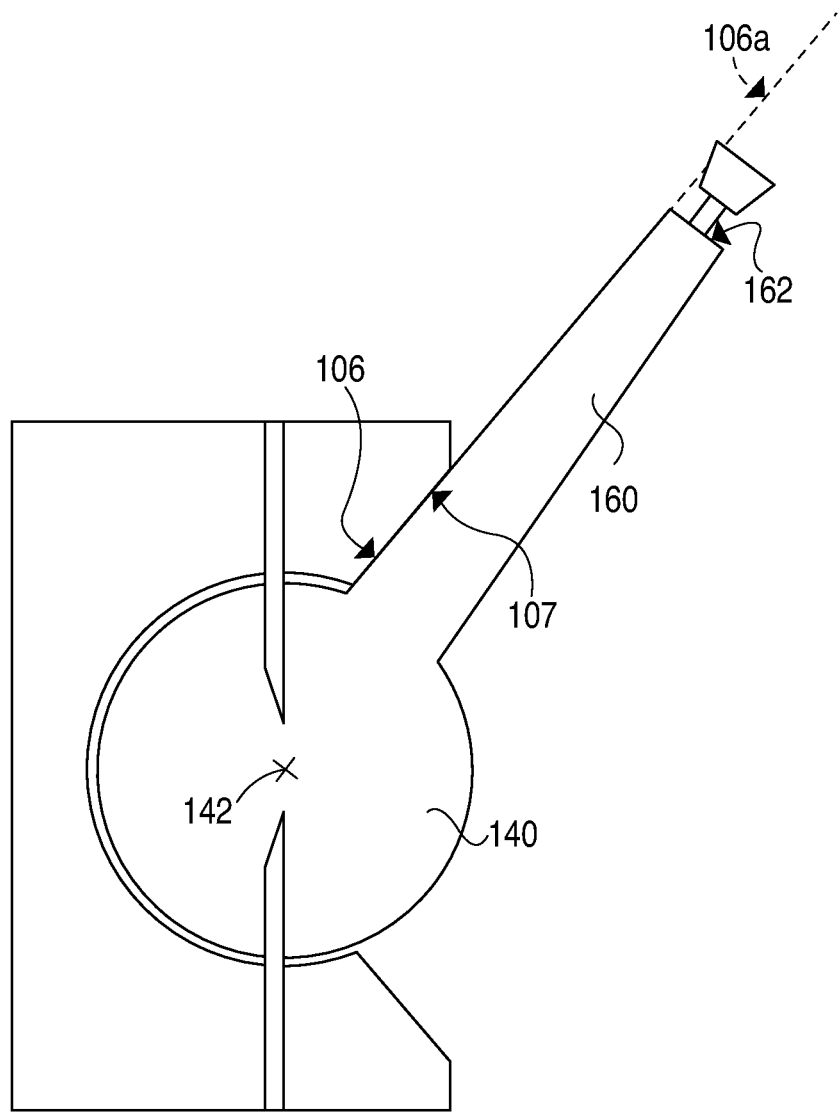
Figure 1D:
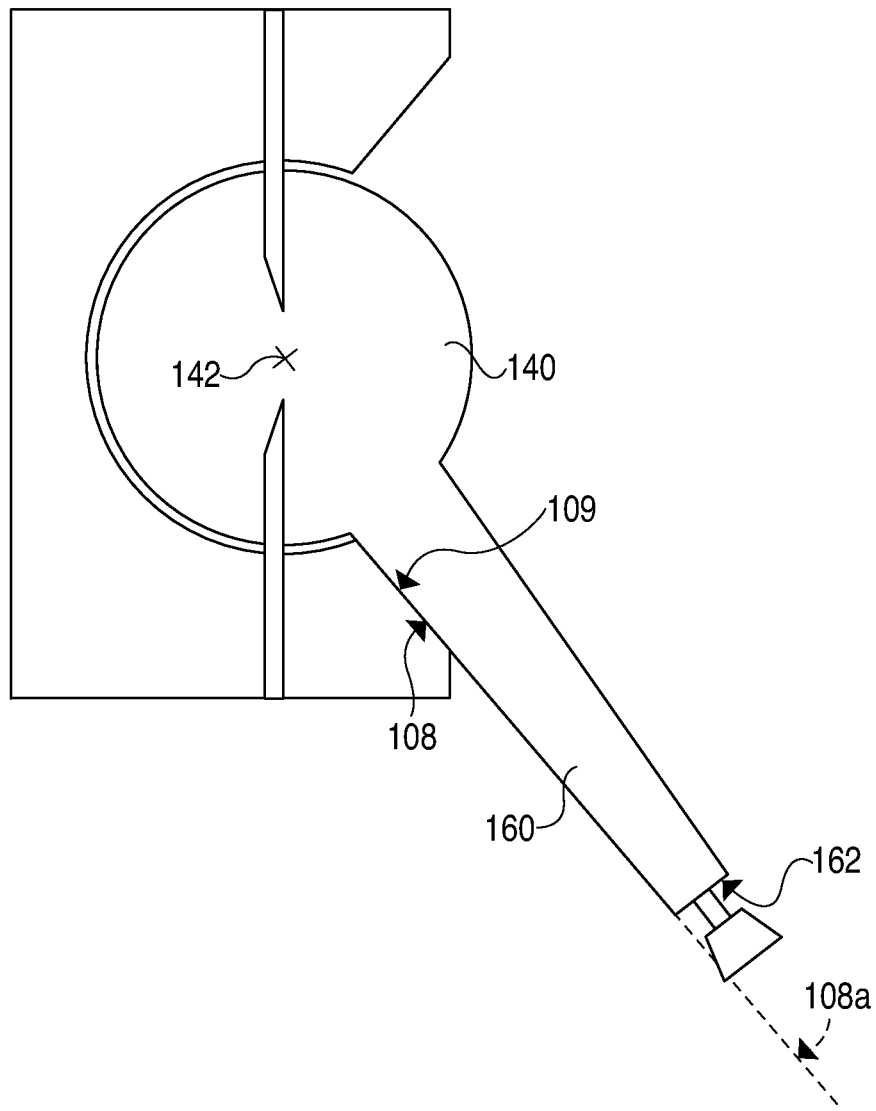
Figure 2:
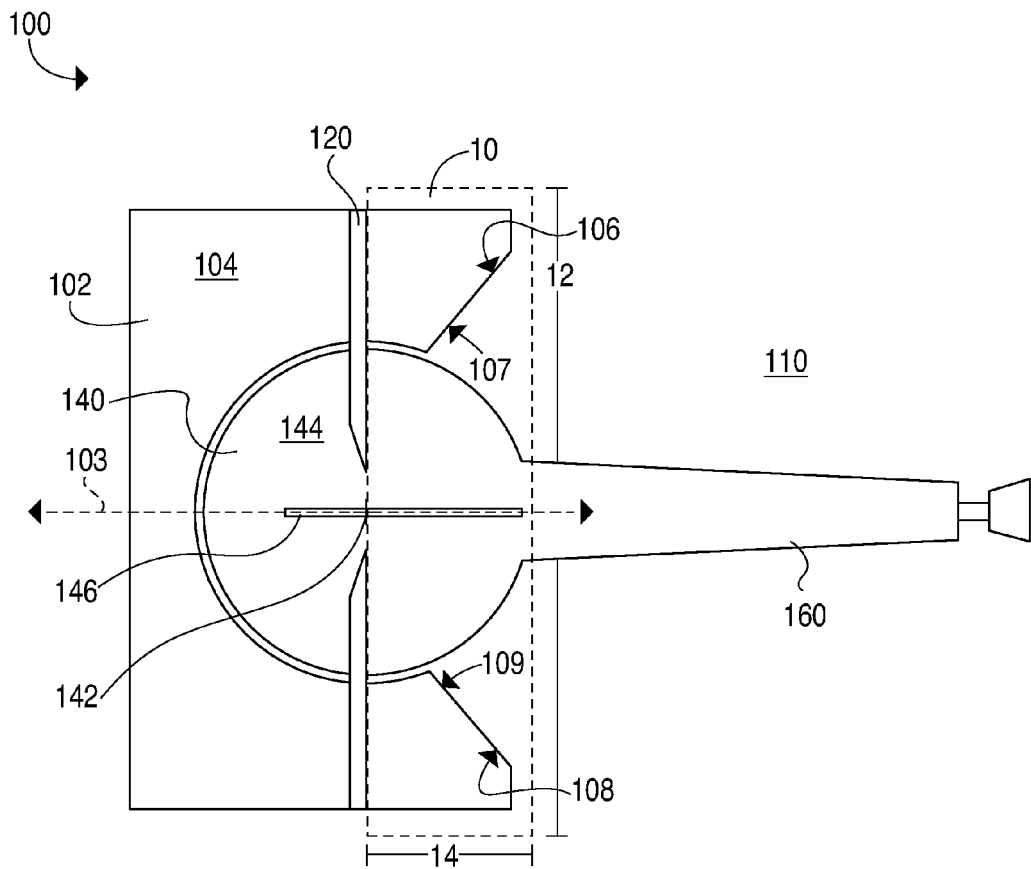
FIG. 2 depicts a top view of the power saw arrangement shown in FIG. 1a and a workpiece.
Figure 3:
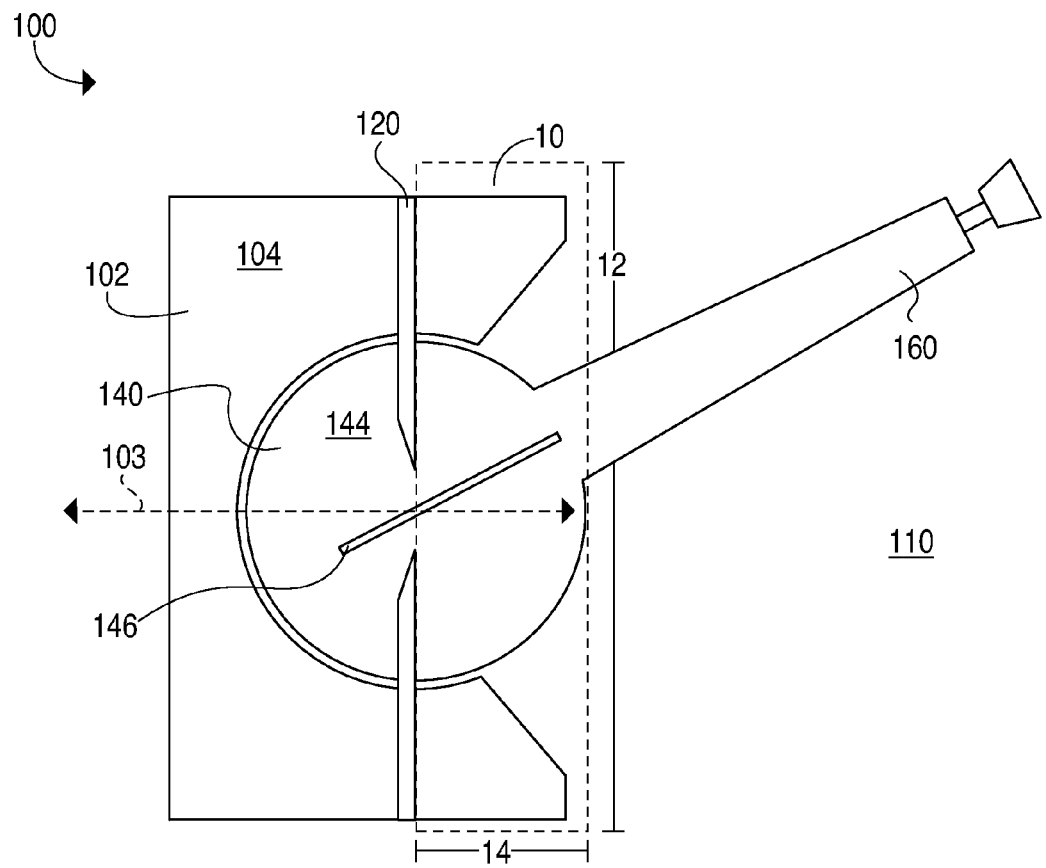
FIG. 3 depicts a top view of the power saw arrangement shown in FIG. 2 with the table rotated relative to the base and a workpiece.

4-18 are substantially similar to the power saw arrangement 100 of FIGS. 2-3 where the motor and saw blade are omitted for simplicity. However, as discussed below, the power saw arrangements shown in FIGS. 4-18 possess different structures to enable accommodation of wider workpieces when desired.

Base with Vertically Rotatable Support

The power saw arrangement 200 shown in FIGS. 4-7 includes a base 202, a table 240 with a handle 260 extending into the handle space 210 and two supplemental supports 270 movably coupled to the base 202. The embodiment of the power saw arrangement 200 shown in FIGS. 4 and 6 includes two supplemental supports 270, but it is understood that the power saw arrangement 200 could alternatively include less than two or more than two supplemental supports 270. Note that the first stop 207 and second stop 209, defining the handle space 210, are provided on the base 202 and are not provided on the supplemental supports 270.

Figure 4:
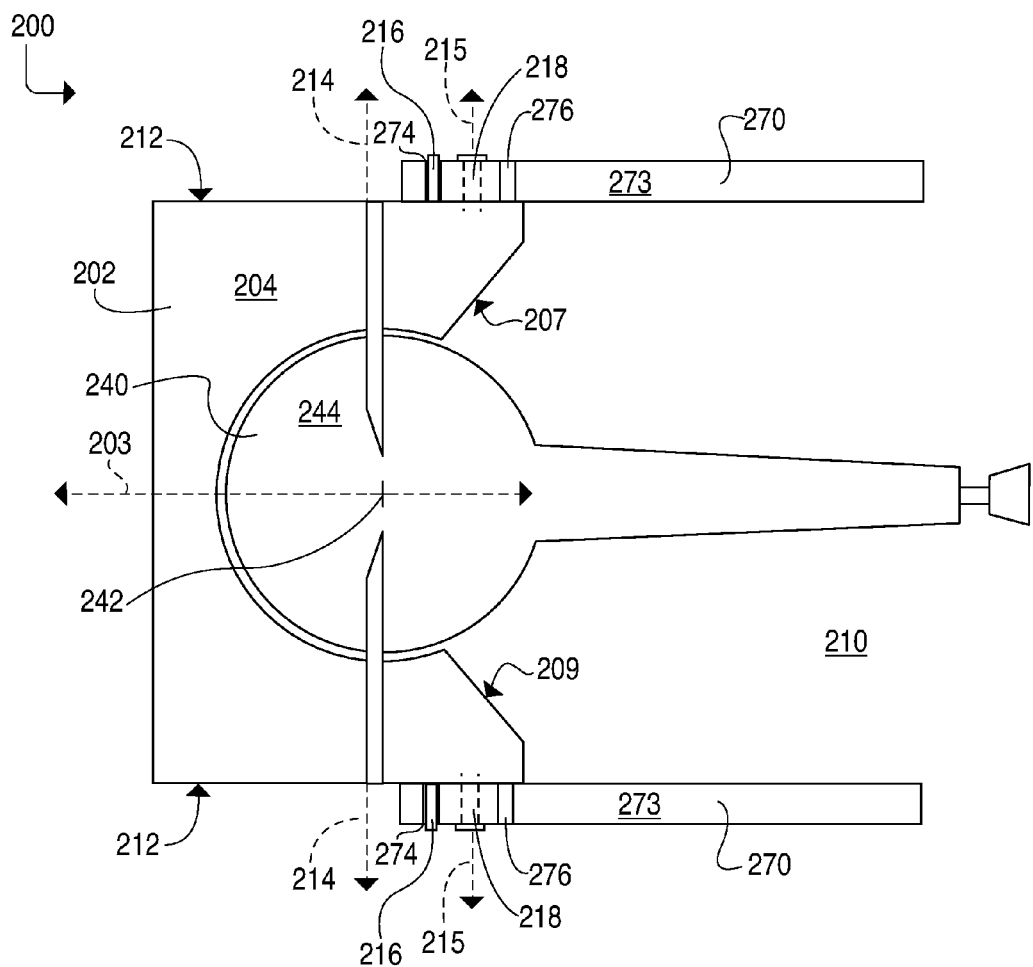
FIG. 4 depicts a top view of one embodiment of a power saw arrangement including supplemental supports in an extended position.
Figure 5:
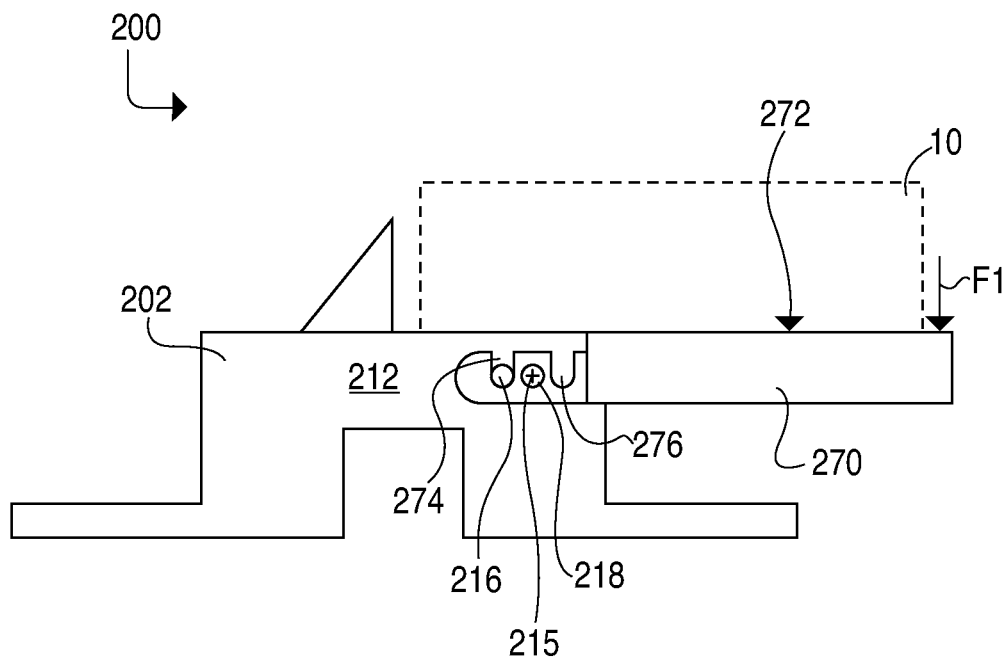
FIG. 5 depicts a side view of the power saw arrangement of FIG. 4 including supplemental supports in an extended position.

As shown in FIG. 4, the base 202 includes base sides 212 that are opposite one another on either side of the centerline 203 and are fixed with respect to the base 202. A side axis 214 that is perpendicular to the table axis 242 and the centerline 203 extends through each base side 212. One supplemental support 270 is coupled to each base side 212 with a fastener 218. Each fastener 218 defines a fastener axis 215 that is orthogonal to the table axis 242 and the centerline 203. Each supplemental support 270 is configured to rotate about the fastener axis 215 at the fastener 218. The fastener 218 may be configured to possess any form which will rotatably couple the supplemental support 270 to the side base 212. For example, in this embodiment, the feature is configured in the form of a pin passing through the supplemental support 270 into the base 202 and a head projecting outwardly from the supplemental support 270 and retaining the supplemental support 270 on the pin. The supplemental supports 270 are rotatable between an extended position (shown in FIGS. 4 and 5) and a retracted position (shown in FIGS. 6 and 7). When the supplemental supports 270 are in the extended position, they are extended into the handle space 210. When the supplemental supports 270 are in the retracted position, they are retracted out of the handle space 210.

As shown in FIG. 4, each supplemental support 270 includes a supplemental support surface 273, an extended notch 274 and a retracted notch 276. Each base side 212 includes a post 216 extending parallel to the fastener axis 215. When the supplemental supports 270 are in the extended position, the posts 216 are received within the extended notches 274 and the supplemental support surfaces 273 are substantially coplanar with the support surface 204 of the base 202 and the table surface 244 of the table 240. Workpieces are placed on the supplemental support surfaces 273 of the supplemental supports 270 when the supplemental supports 270 are in the extended position. As shown more clearly in FIG. 5, the weight of a workpiece 10 on the supplemental support surface 273 creates a force shown by arrow F1. The force F1 causes the post 216 to remain within the extended notch 274.

Figure 6:
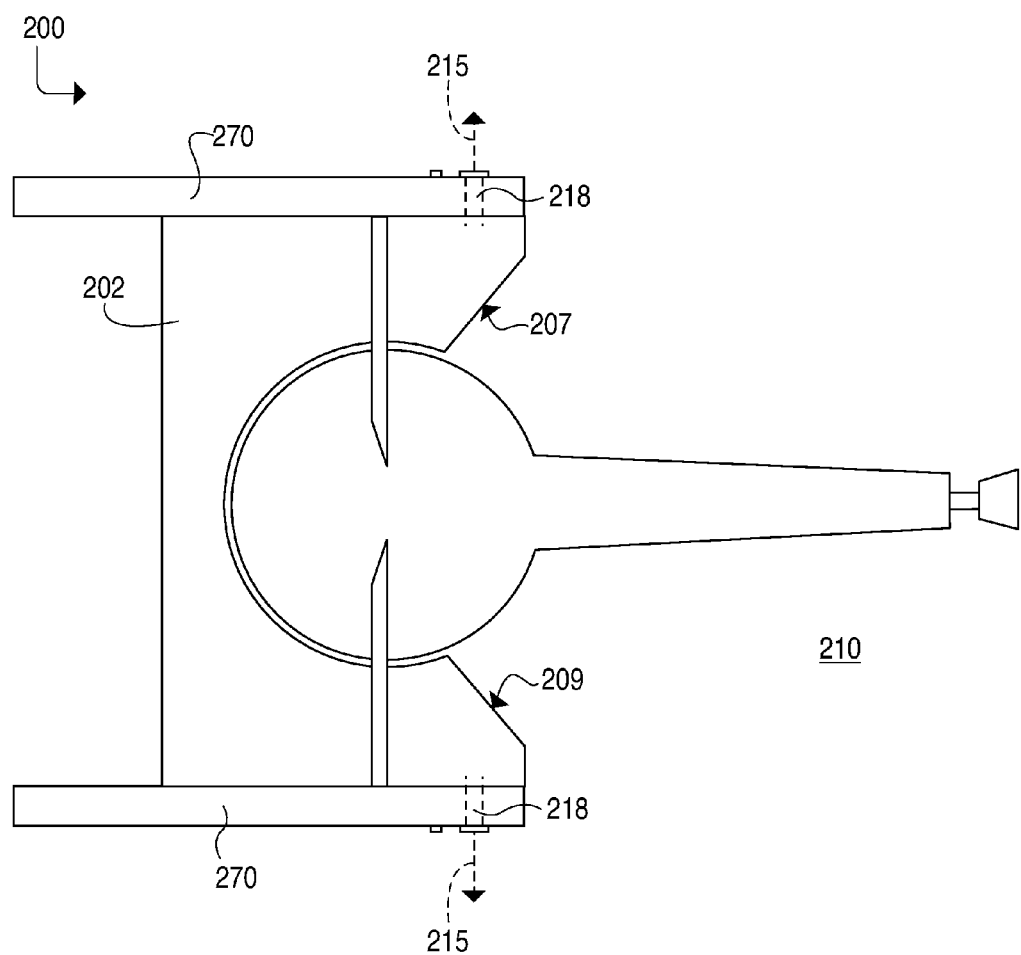
FIG. 6 depicts a top view of the power saw arrangement of FIG. 4 including supplemental supports in a retracted position.
Figure 7:
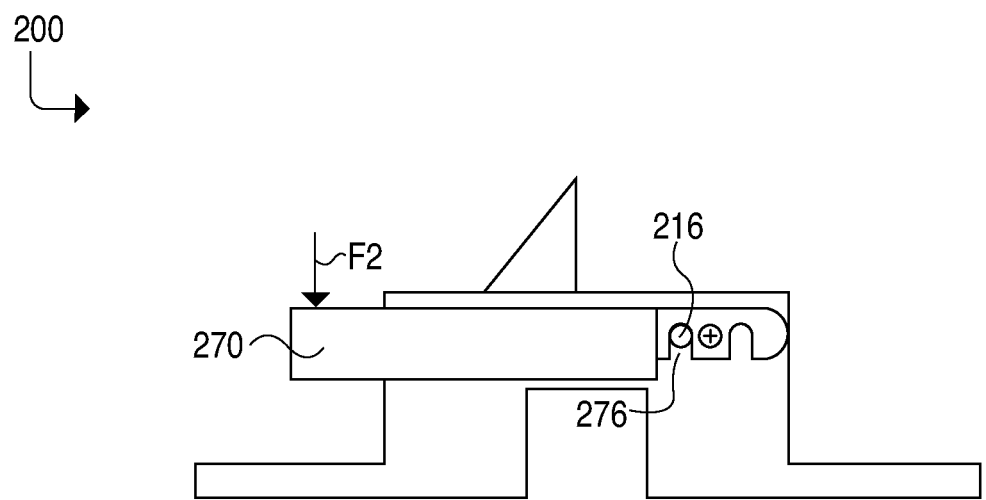
FIG. 7 depicts a side view of the power saw arrangement of FIG. 4 including supplemental supports in a retracted position.

As shown in FIG. 6, the supplemental supports 270 are rotatable about the fastener axes 215 at the fasteners 218 such that they no longer extend into the handle space 210. As shown in FIG. 7, when the supplemental supports 270 are in the retracted position, the posts 216 are received within the retracted notches 276. The force of gravity is shown by arrow F2 and causes the post 216 to remain within the retracted notch 276.

In the embodiment shown in FIGS. 4-7, the supplemental support 270 is provided substantially in the form of a rectangular parallelepiped, also known as a rectangular prism, and the supplemental support surface 273 is a planar surface thereof. However, the supplemental support 270 may be configured to possess any form which will provide support for workpieces that are wider than can be accommodated by the support surface 204 of the base 202 and the table surface 244 of the table 240. The supplemental support 270 could be provided in any form which enables it to rotate about the fastener axis 215 and receive the post 216 within the extended notch 274 such that the supplemental support 270 extends into the handle space 210 when in the extended position and receive the post 216 within the retracted notch 276 such that the supplemental support 270 does not extend into the handle space 210 when in the retracted position. The supplemental support 270 is provided in a form which enables it to support workpieces on its supplemental support surface 273. For example, the supplemental support 270 may be provided substantially in the form of a cylinder including a supplemental support surface 273 in the form of a line on the outer surface of the cylinder rather than a plane on the outer surface of a rectangular parallelepiped.

The power saw arrangement 200 shown in FIGS. 4-7 accommodates workpieces having larger widths than the power saw arrangement 100 shown in FIGS. 2-3 because the supplemental supports 270 in the power saw arrangement 200 provide additional support for workpiece width. A workpiece supported on the power saw arrangement 100 is supported by the support surface 104 and the table surface 144 but a workpiece supported on the power saw arrangement 200 is supported by the support surface 104, the table surface 144 and the supplemental support surface 273 of the supplemental support 270.

Because the supplemental supports 270 of the power saw arrangement 200 are rotatable about the fastener axes 215 between an extended position and a retracted position, the supplemental supports 270 can be used to accommodate wider workpieces when in the extended position (shown in FIGS. 4 and 5) but do not extend into the handle space 110, and thus do not decrease the range of rotation of the handle 160 about the table axis 242, when in the retracted position (shown in FIGS. 6 and 7).

Base with Side Sliding Support

In an alternative embodiment, shown in FIGS. 8a-11, a power saw arrangement 300 with sliding side supports is disclosed. The power saw arrangement 300 includes a base 302, a table 340 with a handle 360 extending into the handle space 310 and two supplemental supports 370 movably coupled to the base 302. The embodiment of the power saw arrangement 300 shown in FIGS. 8a and 10 includes two supplemental supports 370, but it is understood that the power saw arrangement 300 could alternatively include less than two or more than two supplemental supports 370. Note that the first stop 307 and second stop 309, defining the handle space 310, are provided on the base 302 and are not provided on the supplemental supports 370.

Figure 8A:
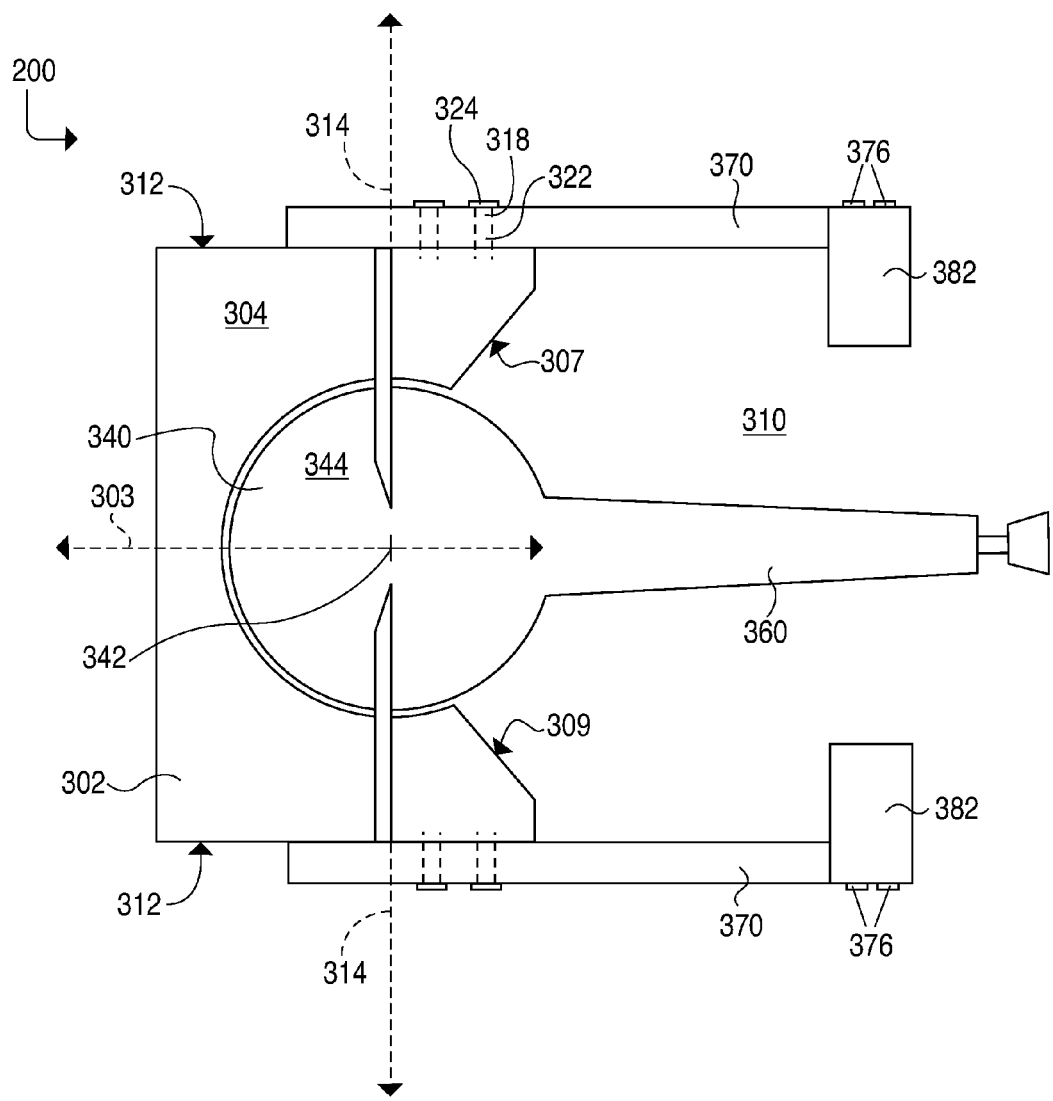
FIG. 8a depicts a top view of another embodiment of a power saw arrangement including supplemental supports in an extended position.

As shown in FIG. 8a, the base 302 includes base sides 312 that are opposite one another on either side of the centerline 303 of the base 302 and are fixed with respect to the base 302. A side axis 314 that is perpendicular to the table axis 342 and the centerline 303 extends through each base side 312. One supplemental support 370 is coupled to each base side 312 with fasteners 318 and is configured to slide relative to the base 302 in a direction perpendicular to the side axis 314 and parallel to the centerline 303. The supplemental supports 370 are slidable relative to the support surface 304 between an extended position (shown in FIGS. 8a and 9) and a retracted position (shown in FIGS. 10 and 11). When the supplemental supports 370 are in the extended position, they are extended into the handle space 310. When the supplemental supports 370 are in the retracted position, they are retracted out of the handle space 310.

Figure 9:
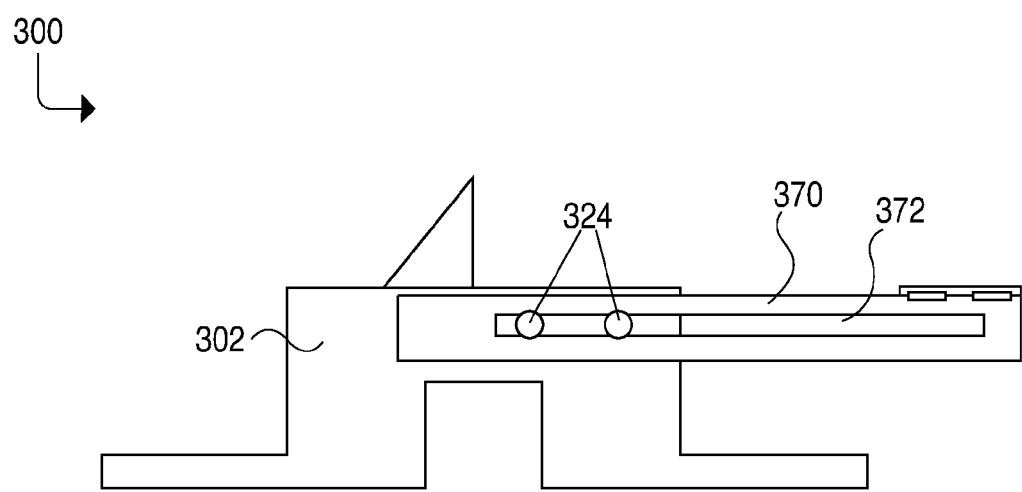
FIG. 9 depicts a side view of the power saw arrangement of FIG. 8a including supplemental supports in an extended position.
Figure 10:
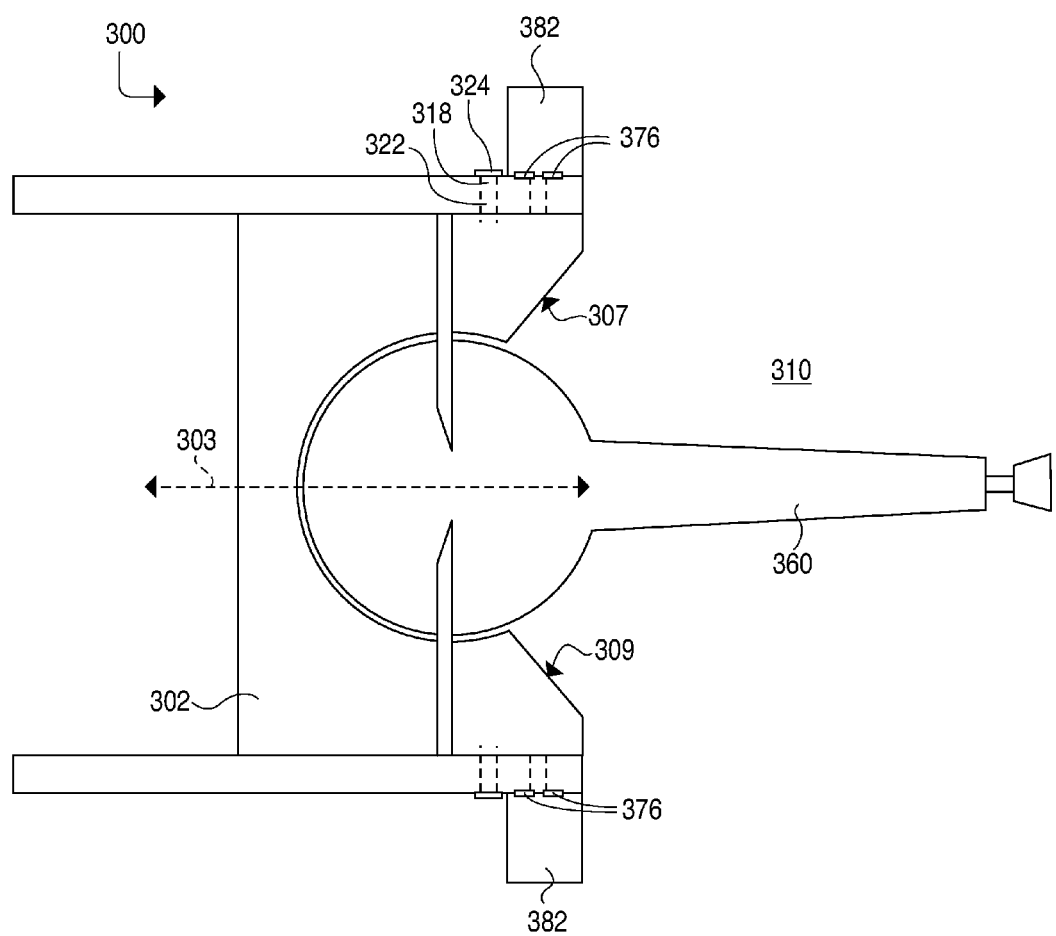
FIG. 10 depicts a top view of the power saw arrangement of FIG. 8a including supplemental supports in a retracted position.
Figure 11:
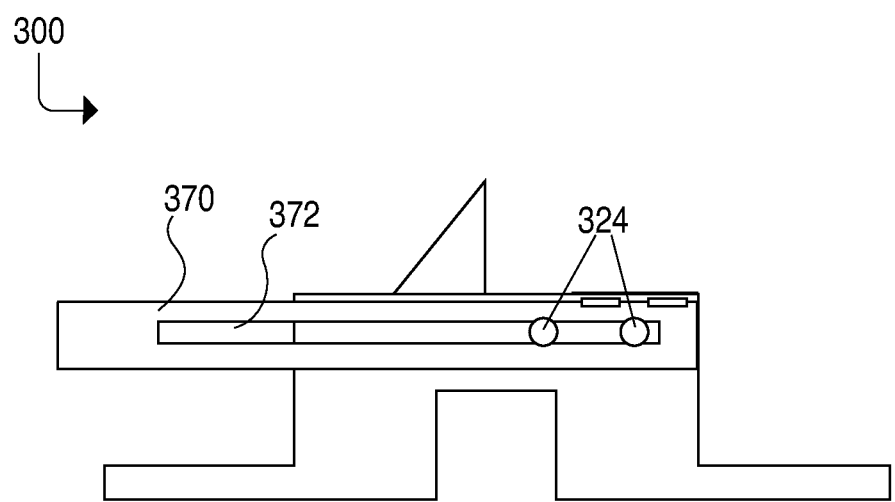
FIG. 11 depicts a side view of the power saw arrangement of FIG. 8a including supplemental supports in a retracted position.

As shown in FIGS. 8a and 10, each fastener 318 includes a post 322 and a head 324. The head 324 is sized larger than the post 322. Each fastener 318 is fixed in place on one of the base sides 312. As shown in FIGS. 9 and 11, each supplemental support 370 includes a slot 372 extending through the supplemental support 370. Each slot 372 is sized such that it is larger than the post 322 but smaller than the head 324 of the fastener 318. The post 322 of each fastener 318 extends through the slot 372, with the head 324 positioned outwardly from the slot 372. The supplemental supports 370 are thus perpendicularly slidable relative to the side axis 314 on the posts 322 and retained on the posts 322 by the heads 324.

As shown in FIGS. 8a and 10, each supplemental support 370 includes a support portion 382. The support portion 382 is movably coupled to the supplemental support 370 by hinges 376. The hinges 376 enable the support portion 382 to rotate upwardly toward the support surface 304 of the base 302 or outwardly away from the centerline 303 of the base 302. When rotated inwardly, the support portions 382 are substantially coplanar with the support surface 304 of the base 302 and the table surface 344 of the table 340. As shown in FIGS. 8a and 9, when the supplemental supports 370 are in the extended position, the support portions 382 are rotated inwardly to provide support for a workpiece. As shown in FIGS. 10 and 11, when the supplemental supports 370 are in the retracted position, the support portions 382 are rotated outwardly so that the support portions 382 do not contact the base 302 and the supplemental supports 370 can be fully removed from the handle space 310.

In an alternative embodiment, the support portions 382 could be provided in any form which is movably coupled to the supplemental supports 370 such that the support portions 382 are substantially coplanar with the support surface 304 of the base 302 and the table surface 344 of the table when in the extended position and do not contact the base 302 such that they can be completely removed from the handle space 310 when in the retracted position.

Because the supplemental supports 370 of the power saw arrangement 300 are perpendicularly slidable relative to the side axes 314, and because the support portions 382 are hingedly coupled to the supplemental supports 370, the supplemental supports 370 can be moved between an extended position and a retracted position. Thus, the supplemental supports 370 can be used to accommodate wider workpieces when in the extended position (shown in FIGS. 8a and 9) but do not extend into the handle space 310, and thus do not decrease the range of rotation of the handle 360 about the table axis 342, when in the retracted position (shown in FIGS. 10 and 11).

Figure 8B:
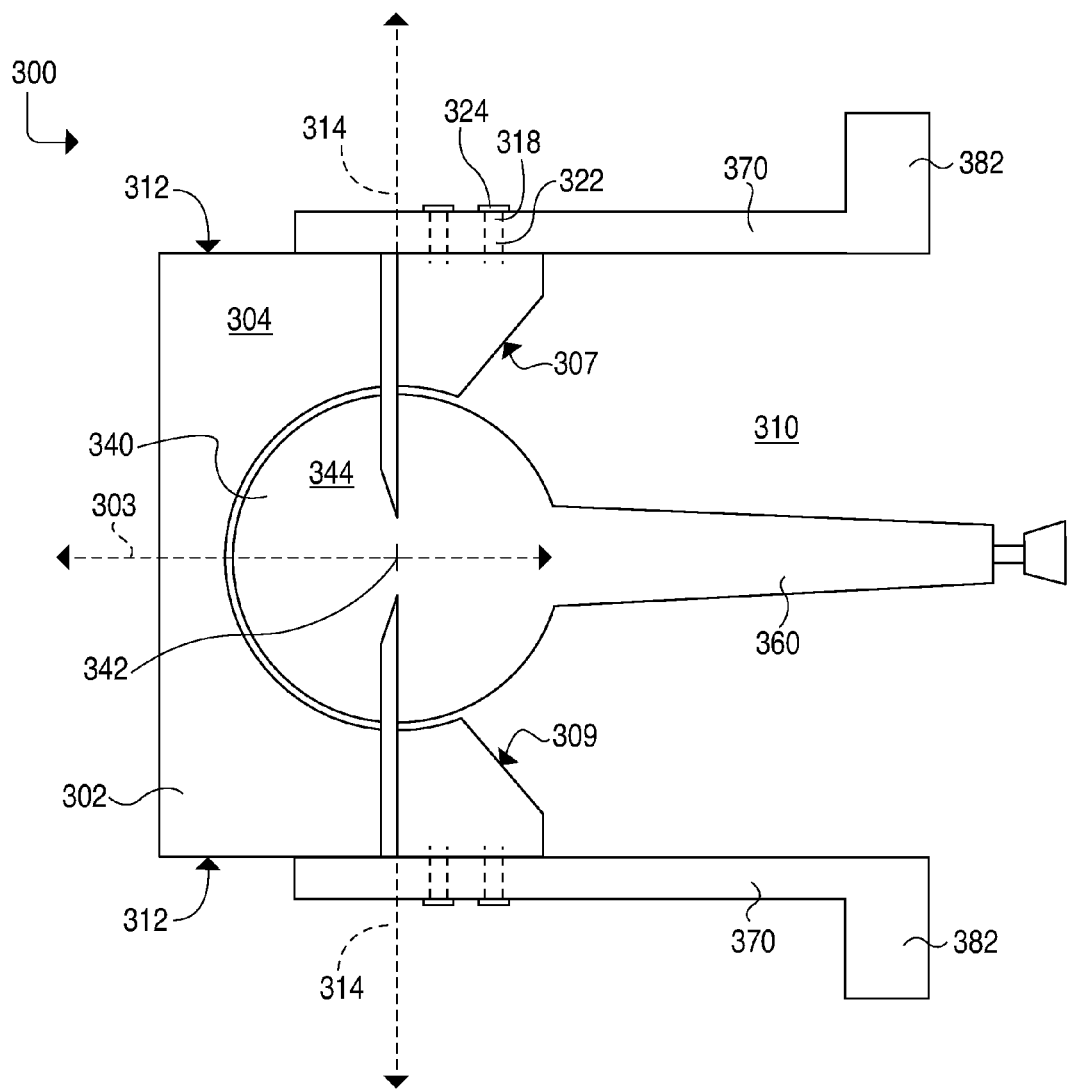
FIG. 8b depicts an alternative embodiment of the power saw arrangement of FIG. 8.

In another alternative embodiment, shown in FIG. 8b, the supplemental supports 370 may not include hinges 376 shown in FIGS. 8a and 9-11. Instead, the supplemental portions 382 are otherwise sized and shaped such that they are fully removed from the handle space 310 when the supplemental supports 370 are in the retracted position. For example, as shown in FIG. 8b, the supplemental portions 382 may extend outwardly from the supplemental supports 370 away from the centerline 303. As another example, the supplemental portions 382 may have a triangular shape that allows the supplemental supports 370 to be fully removed from the handle space 310 when the supplemental supports 370 are in the retracted position with the triangularly shaped supplemental portions 382 abutting the support surface 304 on the base 302.

Base with Horizontally Rotatable Support

Figure 12:
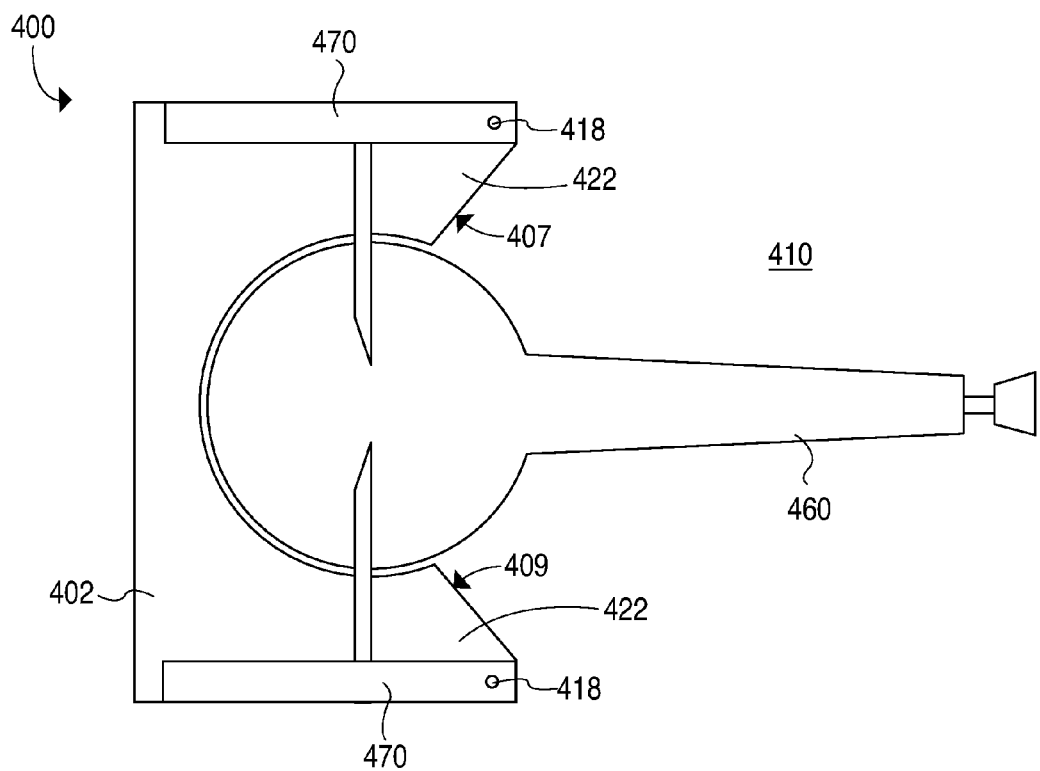
FIG. 12 depicts a top view of another embodiment of a power saw arrangement including supplemental supports in a retracted position.
Figure 13:
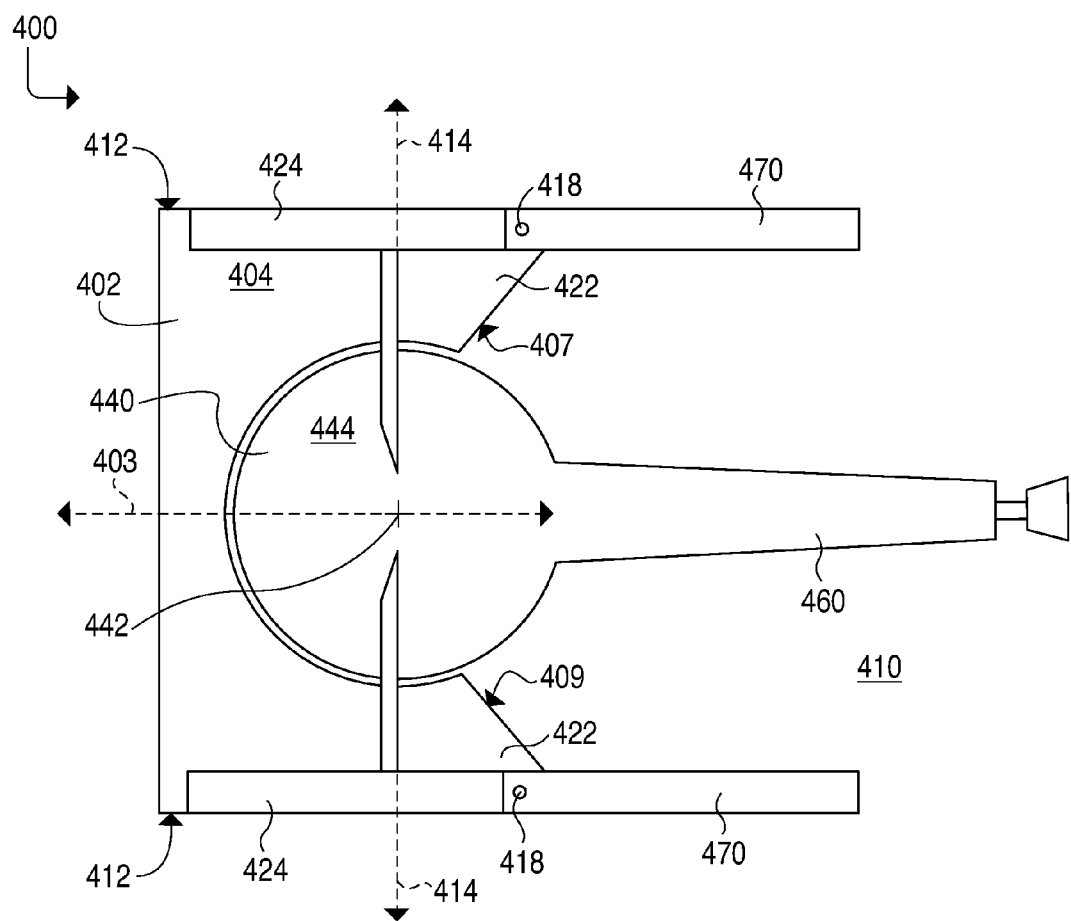
FIG. 13 depicts a top view of the power saw arrangement of FIG. 12 including supplemental supports in an extended position.

In another alternative embodiment, shown in FIGS. 12 and 13, a power saw arrangement 400 with a horizontally rotatable support is disclosed. The power saw arrangement 400 includes a base 402, a table 440 with a handle 460 extending into the handle space 410 and two supplemental supports 470 movably coupled to the base 402. The embodiment of the power saw arrangement 400 shown in FIGS. 12 and 13 includes two supplemental supports 470, but it is understood that the power saw arrangement 400 could alternatively include less than two or more than two supplemental supports 470. Note that the first stop 407 and second stop 409, defining the handle space 410, are provided on the base 402 and are not provided on the supplemental supports 470.

As shown in FIG. 13, the base 402 includes base sides 412 that are opposite one another on either side of the centerline 403 and are fixed with respect to the base 402. Each base side 412 includes a side axis 414 that is perpendicular to the table axis 442 of the table 440 and perpendicular to the centerline 403 of the base 402. Additionally, the base 402 includes lateral portions 422 that are opposite one another on either side of the centerline 403 and are fixed with respect to the base 402. One supplemental support 470 is coupled to each lateral portion 422 with a fastener 418 and is configured to rotate perpendicularly relative to the side axis 414 about the fastener 418. The supplemental supports 470 are rotatable between an extended position (shown in FIG. 13) and a retracted position (shown in FIG. 12).

Shown more clearly in FIG. 13, each lateral portion 422 includes a recess 424 sized and configured to retain the supplemental support 470. The supplemental supports 470 are received in the recesses 424 when in the retracted configuration (shown in FIG. 12) such that the supplemental supports 470 are completely removed from the handle space 410.

When the supplemental supports 470 are in the extended position, they are rotated out of the recesses 424 and extended into the handle space 410 such that they are substantially coplanar with the support surface 404 of the base 402 and the table surface 444 of the table 440. When the supplemental supports 470 are in the retracted position, they are retracted out of the handle space 410 into the recesses 424 and remain substantially coplanar with the support surface 404 of the base 402 and the table surface 444 of the table 440.

Because the supplemental supports 470 of the power saw arrangement 400 are perpendicularly rotatable relative to the side axes 414 and are rotatably coupled to the lateral portions 422, the supplemental supports 470 can be moved between an extended position and a retracted position. Thus, the supplemental supports 470 can be used to accommodate wider workpieces when in the extended position (shown in FIG. 13) but do not extend into the handle space 410, and thus do not decrease the range of rotation of the handle 460 about the table axis 442, when in the retracted position (shown in FIG. 12).

Base with Front Sliding Support

Figure 14:
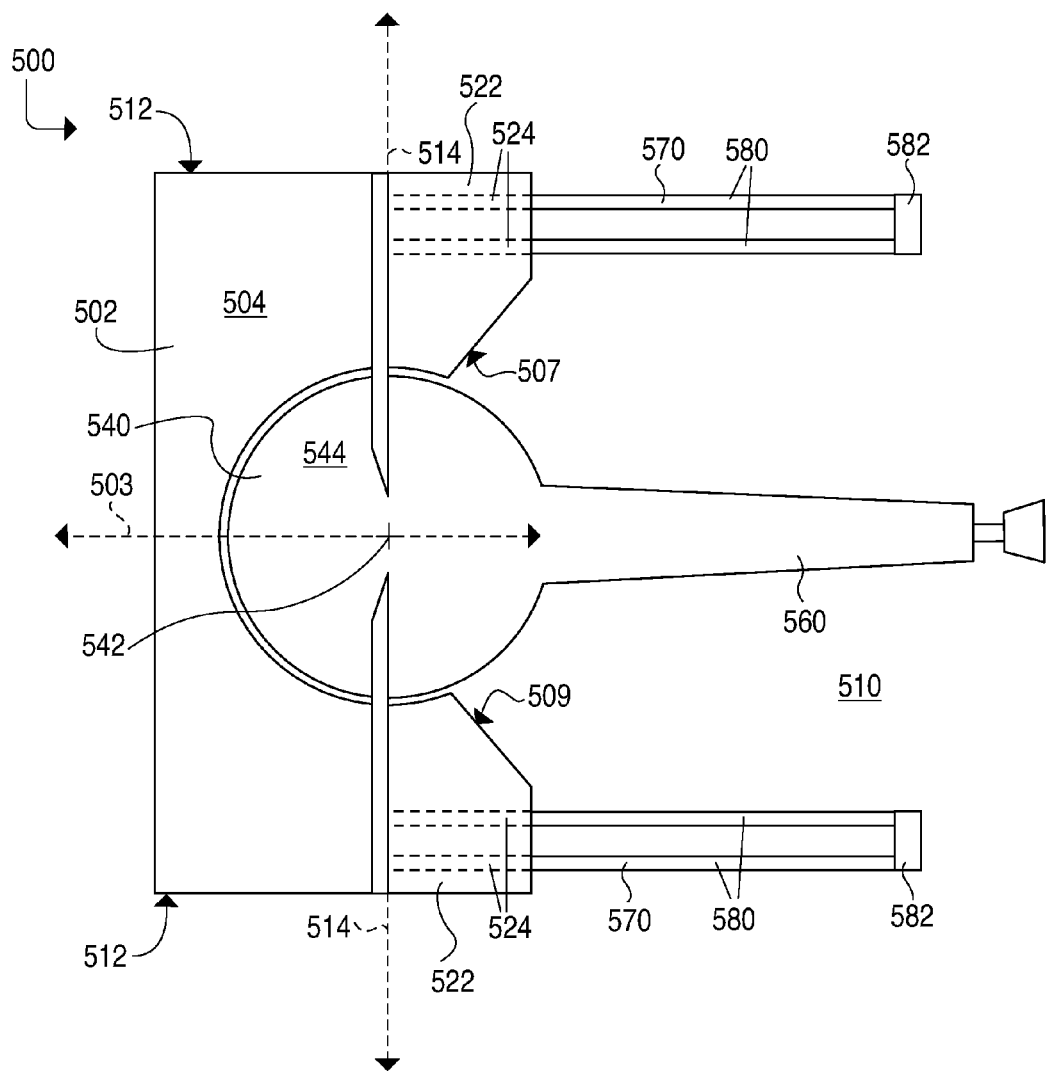
FIG. 14 depicts a top view of another embodiment of a power saw arrangement including supplemental supports in an extended position.
Figure 15:
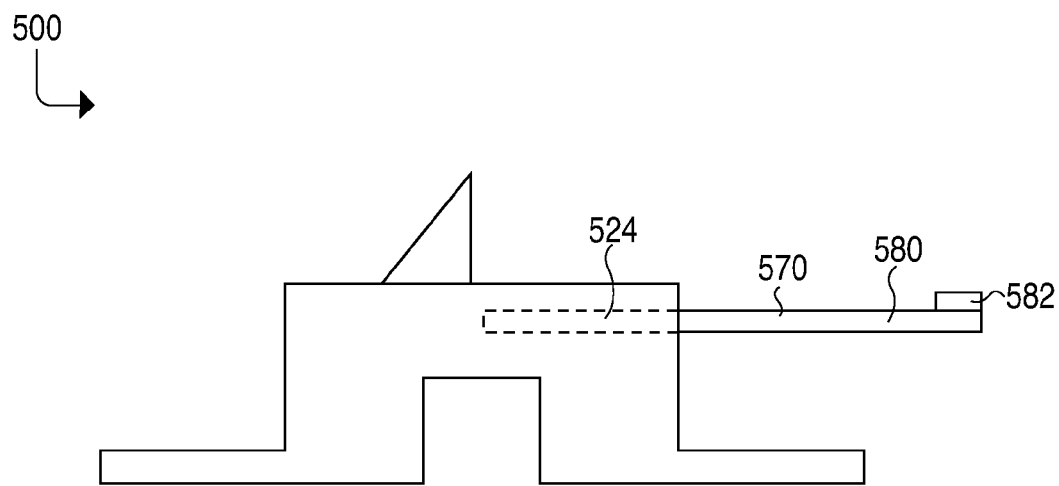
FIG. 15 depicts a side view of the power saw arrangement of FIG. 14 including supplemental supports in an extended position.

In another alternative embodiment, shown in FIGS. 14 and 15, a power saw arrangement 500 with front sliding supports is disclosed. The power saw arrangement 500 includes a base 502, a table 540 with a handle 560 extending into the handle space 510 and two supplemental supports 570 movably coupled to the base 502. The embodiment of the power saw arrangement 500 shown in FIG. 14 includes two supplemental supports 570, but it is understood that the power saw arrangement 500 could alternatively include less than two or more than two supplemental supports 570. Note that the first stop 507 and second stop 509, defining the handle space 510, are provided on the base 502 and are not provided on the supplemental supports 570.

As shown in FIG. 14, the base 502 includes base sides 512 that are opposite one another on either side of the centerline 503 and are fixed with respect to the base 502. A side axis 514 that is perpendicular to the table axis 542 and the centerline 503 extends from each base side 512. Additionally, the base 502 includes lateral portions 522 that are opposite one another on either side of the centerline 503 and are fixed with respect to the base 502. Each lateral portion 522 includes channels 524 sized and configured to retain the supplemental support 570. The channels 524 are aligned perpendicularly relative to the table axis 542, perpendicularly relative to the side axis 514 and in parallel relative to the centerline 503. The supplemental supports 570 are received in the channels 524 when in the extended configuration (shown in FIGS. 14 and 15) such that the supplemental supports 570 extend into the handle space 510. The supplemental supports 570 are removed from the channels 524 when in the retracted position (not shown) such that they are fully removed from the handle space 510.

Each supplemental support 570 consists of two arms 580 and a support portion 582 coupled to the arms 580. When the supplemental supports 570 are in the extended position, the arms 580 are inserted into the channels 524 and the supplemental supports 570 extend into the handle space 510 such that the support portions 582 are substantially coplanar with the support surface 504 of the base 502 and the table surface 544 of the table 540. When the supplemental supports 570 are in the retracted position, the arms 580 are removed from the channels 524 and the supplemental supports 570 are removed from the handle space 510.

In the embodiment shown in FIGS. 14 and 15, the supplemental supports 570 are provided in the form of arms 580 and support portions 582 such that the supplemental supports 570 are in the retracted position when the arms 580 are removed from the channels 524. Alternatively, the supplemental supports 570 could be provided in any form which enables the supplemental supports 570 to extend into the handle space 510 such that the support portions 582 are substantially coplanar with the support surface 504 and the table surface 544 when in the extended position and enables the supplemental supports 570 to be removed from the handle space 510 when in the retracted position. For example, the supplemental supports 570 could be configured such that they are inserted farther into longer channels 524 and do not extend into the handle space 510 when in the retracted position.

Because the supplemental supports 570 of the power saw arrangement 500 are removably inserted into the lateral portions 522 perpendicularly relative to the side axes 514, the supplemental supports 570 can be moved between an extended position and a retracted position. Thus, the supplemental supports 570 can be used to accommodate wider workpieces when in the extended position (shown in FIG. 14) but do not extend into the handle space 510, and thus do not decrease the range of rotation of the handle 560 about the table axis 542, when in the retracted position (not shown).

Base with Top Sliding Support

Figure 16:
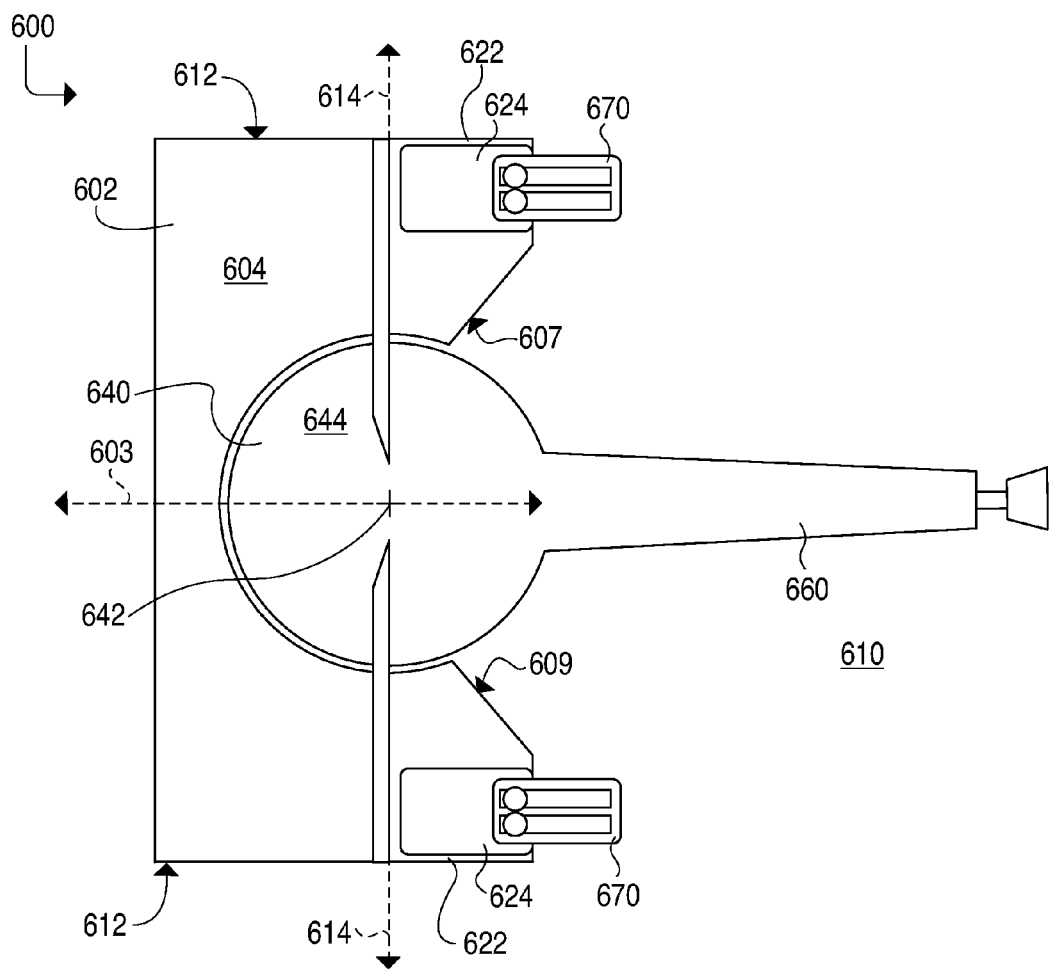
FIG. 16 depicts a top view of another embodiment of a power saw arrangement including supplemental supports in an extended position.
Figure 17:
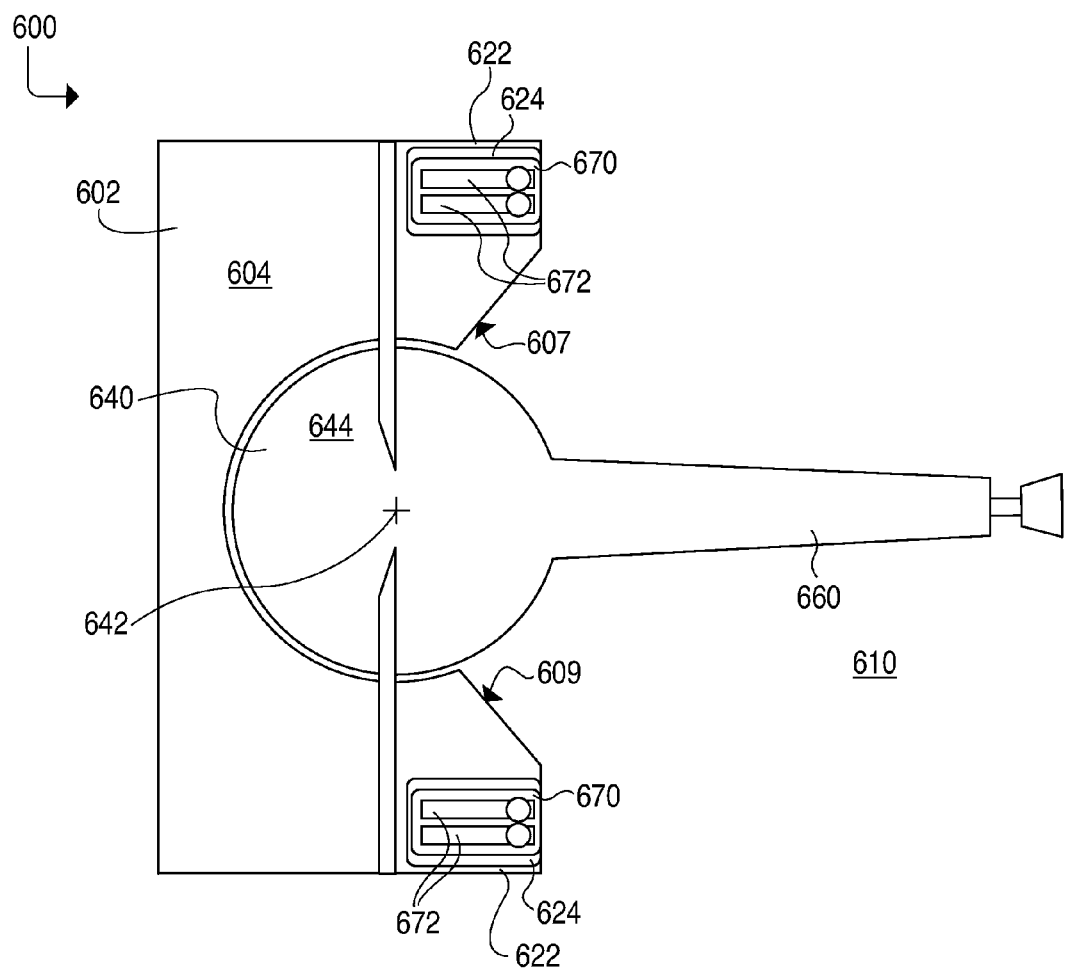
FIG. 17 depicts a top view of the power saw arrangement of FIG. 16 including supplemental supports in a retracted position.
Figure 18:
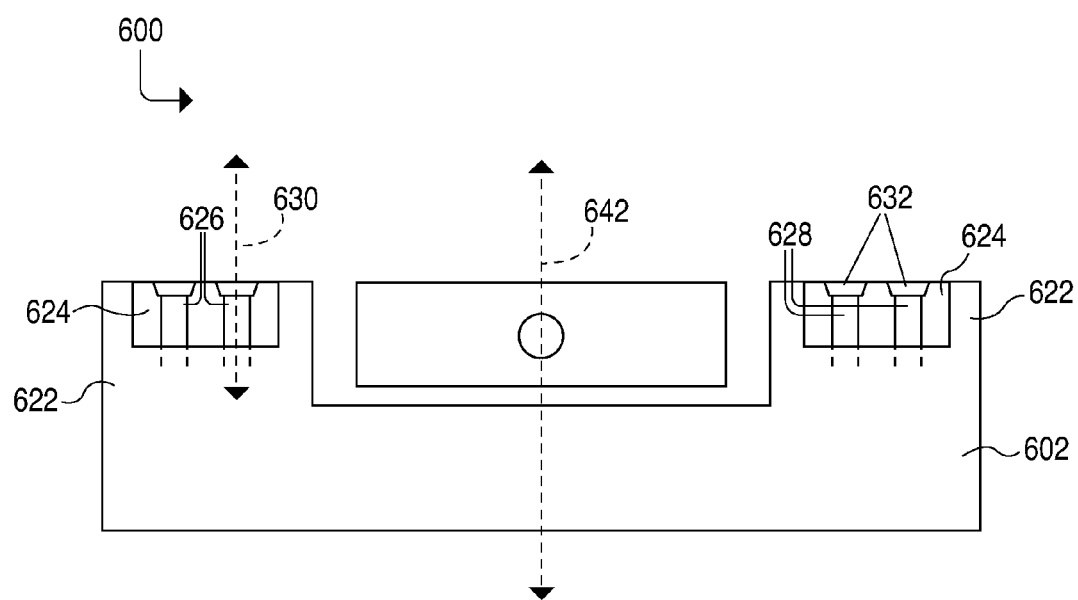
FIG. 18 depicts a front view of the power saw arrangement of FIG. 16 excluding supplemental supports.

In yet another alternative embodiment, shown in FIGS. 16-18, a power saw arrangement 600 with a top sliding support is disclosed. The power saw arrangement 600 includes a base 602, a table 640 with a handle 660 extending into the handle space 610 and two supplemental supports 670 movably coupled to the base 602. The embodiment of the power saw arrangement 600 shown in FIGS. 16 and 17 includes two supplemental supports 670, but it is understood that the power saw arrangement 600 could alternatively include less than two or more than two supplemental supports 670. Note that the first stop 607 and second stop 609, defining the handle space 610, are provided on the base 602 and are not provided on the supplemental supports 670.

As shown in FIG. 16, the base 602 includes base sides 612 that are opposite one another on either side of the centerline 603 and are fixed with respect to the base 602. Each base side 612 includes a side axis 614 that is perpendicular to the table axis 642 of the table 640 and perpendicular to the centerline 603 of the base 602. Additionally, the base 602 includes lateral portions 622 that are opposite one another on either side of the centerline 603 and are fixed with respect to the base 602. Each lateral portion 622 includes recesses 624 sized and configured to retain the supplemental support 670. The recesses 624 are aligned perpendicularly relative to the table axis 642, perpendicularly relative to the side axis 614 and in parallel with the centerline 603.

The supplemental supports 670 are slidable with respect to the base 602 between the extended position and the retracted position. The supplemental supports 670 are extended out of the recesses 624 when in the extended position (shown in FIG. 16) such that they extend into the handle space 610. The supplemental supports 670 are received in the recesses 624 when in the retracted position (shown in FIG. 17) such that the supplemental supports 670 are completely removed from the handle space 610. The supplemental supports 670 are coplanar with the table surface 644 of the table 640 and the support surface 604 of the base 602 when in the retracted position and in the extended position. As shown in FIGS. 16 and 17, the supplemental supports 670 include slots 672 extending through the supplemental supports 670 in a direction parallel with the table axis 642.

For simplicity, FIG. 18 does not include the supplemental supports 670. As shown in FIG. 18, the base 602 includes recesses 624 in the lateral portions 622. Each recess 624 includes mount members 626. Each mount member 626 consists of a post 628 and a head 632. The post 628 is fixed with respect to the recess 624. The post 628 extends along a post axis 630 which is parallel to the table axis 642 and is perpendicular to the slot 672 in the supplemental support 670. The post 62 is dimensioned such that it fits within a slot 672 in a supplemental support 670 (shown in FIGS. 16-17). The head 632 is coupled to the post 628 and sized larger than the post 628. The head 632 is dimensioned such that it is larger than, and does not fit within, the slot 672 in the supplemental support 670. The mount members 626 are configured such that the posts 628 extend through the slots 672 in the supplemental supports 670 and the supplemental supports 670 are retained on the posts 628 by the head 632.

In the embodiment shown in FIGS. 16-18, each recess 624 includes two mount members 626 and each supplemental support 670 includes two corresponding slots 672. In an alternative embodiment, each recess 624 may include more or fewer than two mount members 626 and each supplemental support 670 includes a corresponding number of slots 672.

In the embodiment shown in FIGS. 16-18, the recesses 624 are provided on the lateral portions 622 of the base 602 and the post axes 630 extend perpendicularly to the side axes 614 and in parallel with the table axis 642. In an alternative embodiment, the recesses 624 may be provided on the base sides 612 of the base 602 and the post axes 630 may extend in parallel with the side axes 614 and perpendicularly to the table axis 642.

Because the supplemental supports 670 of the power saw arrangement 600 are perpendicularly slidable into and out of recesses 624 in the lateral portions 622 of the base 602 and remain coplanar with the table surface 644 and the support surface 604, the supplemental supports 670 can be moved between an extended position and a retracted position. Thus, the supplemental supports 670 can be used to accommodate wider workpieces when in the extended position (shown in FIG. 16) but do not extend into the handle space 610, and thus do not decrease the range of rotation of the handle 660 about the table axis 642, when in the retracted position (shown in FIG. 17).

The foregoing detailed description of one or more embodiments of the power saw arrangement has been presented herein by way of example only and not limitation. It will be recognized that there are advantages to certain individual features and functions described herein that may be obtained without incorporating other features and functions described herein. Moreover, it will be recognized that various alternatives, modifications, variations or improvements of the above-disclosed embodiments and other features and functions, or alternatives thereof, may be desirably combined into many other different embodiments, systems or applications. Presently unforeseen or unanticipated alternatives, modifications, variations or improvements therein may be subsequently made by those skilled in the art which are also intended to be encompassed by the appended claims. Therefore, the spirit and scope of any appended claims should not be limited to the description of the embodiments contained herein.

What is claimed is:

1. A power saw arrangement including a saw blade comprising:
   a base defining a support surface, said base further including a first stop and a second stop and a front side aligned with outermost edges of the first and second stops;
   a table moveably coupled to said base and configured to rotate about a table axis;
   a handle extending from said table, wherein said table and said handle are moveable relative to said base between a first position wherein said handle contacts said first stop and a second position wherein said handle contacts said second stop, wherein a handle space is defined in a plane of movement of said handle between the first stop and the second stop; and
   a supplemental support movably coupled to said base and moveable between an extended position, wherein the supplemental support extends beyond the front side of the base to support a workpiece, and a retracted position, wherein the supplemental support does not extend beyond the front side of the base,
   wherein the supplemental support is not positioned within said handle space in the retracted position and is positioned within said handle space in the extended position,
   wherein the supplemental support does not provide the first stop or the second stop, and
   wherein the supplemental support includes a planar surface, wherein the planar surface of the supplemental support is parallel to and coplanar with the support surface of the base when the supplemental support is in the extended position.

2. The power saw arrangement of claim 1, wherein the supplemental support is a first supplemental support, the power saw further comprising a second supplemental support movably coupled to said base and moveable between an extended position and a retracted position, wherein the second supplemental support is not positioned within said handle space in the retracted position and is positioned within said handle space in the extended position.

3. The power saw arrangement of claim 2, wherein said base further includes a first side and a second side, wherein said first side and said second side are fixed upon said base, said supplemental support being moveably coupled to said first side and said second supplemental support being moveably coupled to said second side.

4. The power saw arrangement of claim 3, wherein said support surface includes a first recess configured to receive said supplemental support and a second recess configured to receive said second supplemental support.

5. The power saw arrangement of claim 4, wherein said supplemental support is received in said first recess when in said retracted position and said second supplemental support is received in said second recess when in said retracted position.

6. The power saw arrangement of claim 2, wherein:
   said handle is movable between said first position and said second position when said first supplemental support is in said retracted position and said second supplemental support is in said retracted position, and wherein said handle is blocked from at least one of said first and second positions when at least one of said first and second supplemental supports is in said extended position.

7. The power saw arrangement of claim 1, wherein:
   said supplemental support is configured to rotate about an axis perpendicular to said table axis when moving between said extended position and said retracted position.

8. The power saw arrangement of claim 1, wherein:
   said supplemental support is slidable between said extended position and said retracted position in a direction perpendicular to said table axis.

9. A power saw comprising:
   a base including a support surface, said base further including a first wall and a second wall;
   a table configured to rotate relative to the base about a table axis, the table including a table surface that is perpendicular to the table axis and substantially coplanar with the support surface;
   a handle projecting from the table, wherein said handle is moveable within a handle space between said first wall and said second wall;
   a saw coupled to the table and configured to rotate with the table; and
   a supplemental support coupled to the base and rotatable with respect to the base about an axis that is perpendicular to the table axis, the supplemental support movable between an extended position wherein the supplemental support extends into the handle space and a retracted position wherein the supplemental support does not extend into the handle space, the supplemental support including a planar surface,
   wherein the handle is blocked from contacting one of the first wall and the second wall when the supplemental support is in the extended position,
   wherein the handle is not blocked from contacting one of the first wall and the second wall when the supplemental support is in the retracted position, and
   wherein the planar surface of the supplemental support is parallel to and coplanar with the support surface of the base when the supplemental support is in the extended position.

10. The power saw of claim 9 wherein the supplemental support includes an arm rotatably mounted to a side of the base.

11. The power saw of claim 9 wherein the planar surface of the supplemental support is not substantially coplanar with the support surface of the base when the supplemental support is in the retracted position.

* * * * *